(12) United States Patent
Huang

(10) Patent No.: US 6,608,706 B1
(45) Date of Patent: Aug. 19, 2003

(54) SCANNING METHOD FOR PERFORMING A LOW RESOLUTION SCAN BY USING A HIGH RESOLUTION SCANNING MODULE

(75) Inventor: Hung-Jung Huang, Hsin-Chu Hsien (TW)

(73) Assignee: Mustek Systems Inc., Hsin-Chu (TW)

( * ) Notice: Subject to any disclaimer, the term of this patent is extended or adjusted under 35 U.S.C. 154(b) by 0 days.

(21) Appl. No.: 09/352,746

(22) Filed: Jul. 14, 1999

(30) Foreign Application Priority Data

May 20, 1999 (TW) ........................................ 88108320 A

(51) Int. Cl.$^7$ ............................................... H04M 1/04
(52) U.S. Cl. ........................................ 358/483; 358/482
(58) Field of Search ................................ 358/483, 482, 358/474, 1.2; 348/294, 297, 298, 311–316

(56) References Cited

U.S. PATENT DOCUMENTS

| | | | | |
|---|---|---|---|---|
| 3,801,884 A | * | 4/1974 | Sequin | 317/23 |
| 3,909,803 A | * | 9/1975 | Bankowski, Jr. | 340/173 |
| 5,337,163 A | * | 8/1994 | Kawamoto | 358/482 |
| 5,416,611 A | * | 5/1995 | Tandon | 358/486 |
| 5,986,267 A | * | 11/1999 | West | 250/370.08 |
| 6,153,874 A | * | 11/2000 | Monoi | 250/208.1 |

* cited by examiner

Primary Examiner—Jerome Grant, II
Assistant Examiner—Negussie Worku
(74) Attorney, Agent, or Firm—Winston Hsu

(57) ABSTRACT

The present invention provides a scanning method for performing a low resolution scan by using a high resolution scanning module. The scanning module comprises a plurality of linearly arranged photo sensors, a shift register, and an output unit. The low resolution scanning method is as follows: 1. activating the photo sensors to sense the light transmitted from the document for a first predetermined time period to generate correspondent induced charges, 2. transmitting the induced charges from the photo sensors into corresponding storage units, 3. shifting the induced charges stored in the storage units into the output unit in sequence, 4. after a first predetermined number of the induced charges being accumulated in the output unit, outputting the induced voltage of the output unit and then resetting the output unit to continue receiving the induced charge from the output port, and 5. repeating the previous step until all the induced charges in the storage units are outputted.

16 Claims, 4 Drawing Sheets

1200 dpi ○ ○ ○ ○ ○ ○ ○ ○ - - - -
600 dpi ○ × ○ × ○ × ○ × - - - - -

SCANNING METHOD FOR PERFORMING A LOW RESOLUTION SCAN BY USING A HIGH RESOLUTION SCANNING MODULE

BACKGROUND OF THE INVENTION

1. Field of the Invention

The present invention relates to a scanning method for performing a low resolution scan, and more particularly, to a scanning method for performing a low resolution scan by using a high resolution scanning module.

2. Description of the Prior Art

Please refer to FIG. 1. FIG. 1 is a schematic diagram of the charge coupled device (CCD) 24 of a high resolution scanning module. The main component of the prior art scanning module is a charge coupled device (CCD) 24. The CCD 24 of the prior art high resolution scanning module comprises a plurality of linearly arranged photo sensors 12, a shift register 14, and an output unit 20. The shift register 14 comprises a plurality of serially connected storage units 16 and an output port 18. The number of the storage units 16 is equal to the number of the photo sensors 12 and each of the storage units 16 is electrically connected with one correspondent photo sensor 12. Each photo sensor senses a document and generates the correspondent induced charges, and each storage unit 16 stores the induced charges generated by the connected photo sensor 12. The induced charges stored in the storage units 16 are able to serially migrate toward the output port 18 where they are sequentially output. The output unit 20 is electrically connected to the output port 18 of the shift register 14 and receives the induced charges outputted from the output port 18 to generate a correspondent induced voltage. Therefore, the induced voltage outputted from the output unit 20 possesses image data. The output unit 20 outputs the induced voltage to an A/D converter 22 electrically connected to the output unit 20 where the induced voltage outputted from the output unit 20 is converted into a digital image signal.

When using the CCD 24 of the high resolution scanning module to perform the highest resolution scan on a document, the scanning method comprises the following steps:

Step 1: activating the photo sensors 12 to sense the light transmitted from the document for a predetermined time period to generate correspondent induced charges;

Step 2: transmitting the induced charges from the photo sensors 12 into corresponding storage units 16;

Step 3: shifting the induced charges stored in the storage units 16 into the output unit 20 in sequence;

Step 4: outputting the induced voltage of the output unit 20 after induced charges of one storage unit 16 are accumulated in the output unit 20, and resetting the output unit 20 to continue receiving the induced charges from the output port 18, and using the A/D converter 22 to convert the induced voltage outputted from the output unit 20 into a digital image signal;

Step 5: repeating the previous step until all the induced charges in the storage units 16 are outputted.

Please refer to FIG. 2. FIG. 2 is a schematic diagram of the selection of the image data when performing a low resolution scan according to the prior art. When using the CCD 24 of the high resolution scanning module to perform a low resolution scan, for example, scanning at 600 dpi with the highest possible resolution being 1200 dpi (dots per inch), the difference between the low resolution scan and the high resolution scan is the selection of the image data. As shown in FIG. 2, when scanning is performed at 1200 dpi, the induced charges in each of the storage units 16 are transmitted to the output port 18. When scanning is performed at 600 dpi, the induced charges in every other storage unit 16 are transmitted.

Increases in the speed of transmission of interfaces has led to rapid transmission speeds in current interfaces. The prior art method of discarding part of the image data during low resolution scanning with a high resolution scanning module cannot effectively enhance the scanning speed of the low resolution scan due to exposure time limitations. As a result, the low resolution scan cannot be performed rapidly.

SUMMARY OF THE INVENTION

It is therefore a primary objective of the present invention to provide a scanning method for performing a low resolution scan by using a high resolution scanning module to solve the above mentioned problem.

In a preferred embodiment, the present invention provides a scanning method for performing a low resolution scan by using a high resolution scanning module, the scanning module comprising:

a plurality of linearly arranged photo sensors, each of the photo sensors being capable of sensing light transmitted from a document to generate correspondent induced charges;

a shift register comprising a plurality of serially connected storage units and an output port, the number of the storage units being equal to the number of the photo sensors, each of the storage units being electrically connected with one correspondent photo sensor for storing the induced charges generated by the connected photo sensor, the induced charges stored in the storage units being able to serially migrate toward the output port and sequentially output from the output port; and an output unit electrically connected to the output port of the shift register for receiving the induced charges output from the output port and generating a correspondent induced voltage; the low resolution scanning method comprising:

activating the photo sensors to sense the light transmitted from the document for a first predetermined time period to generate correspondent induced charges;

transmitting the induced charges from the photo sensors into corresponding storage units;

shifting the induced charges stored in the storage units into the output unit in sequence;

outputting the induced voltage of the output unit after induced charges of a first predetermined number of the storage units are accumulated in the output unit, and resetting the output unit to continue receiving the induced charges from the output port; and repeating the previous step until all the induced charges in the storage units are output.

It is an advantage of the present invention that the exposure time of the photo sensors is shortened when performing a low resolution scan, so the low resolution scan can be performed rapidly.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figures 1, 2:
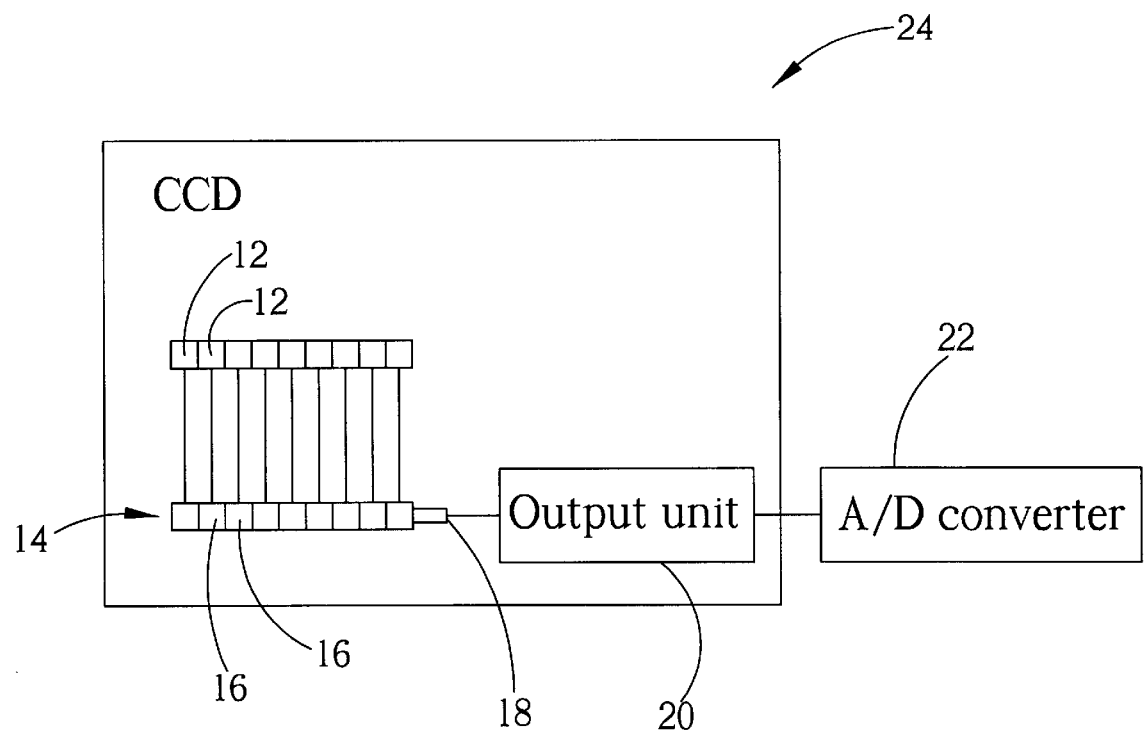
FIG. 1 is a schematic diagram of the CCD of a high resolution scanning module.
FIG. 2 is a schematic diagram of the selection of the image data when performing a low resolution scan according to the prior art.
Figure 3:
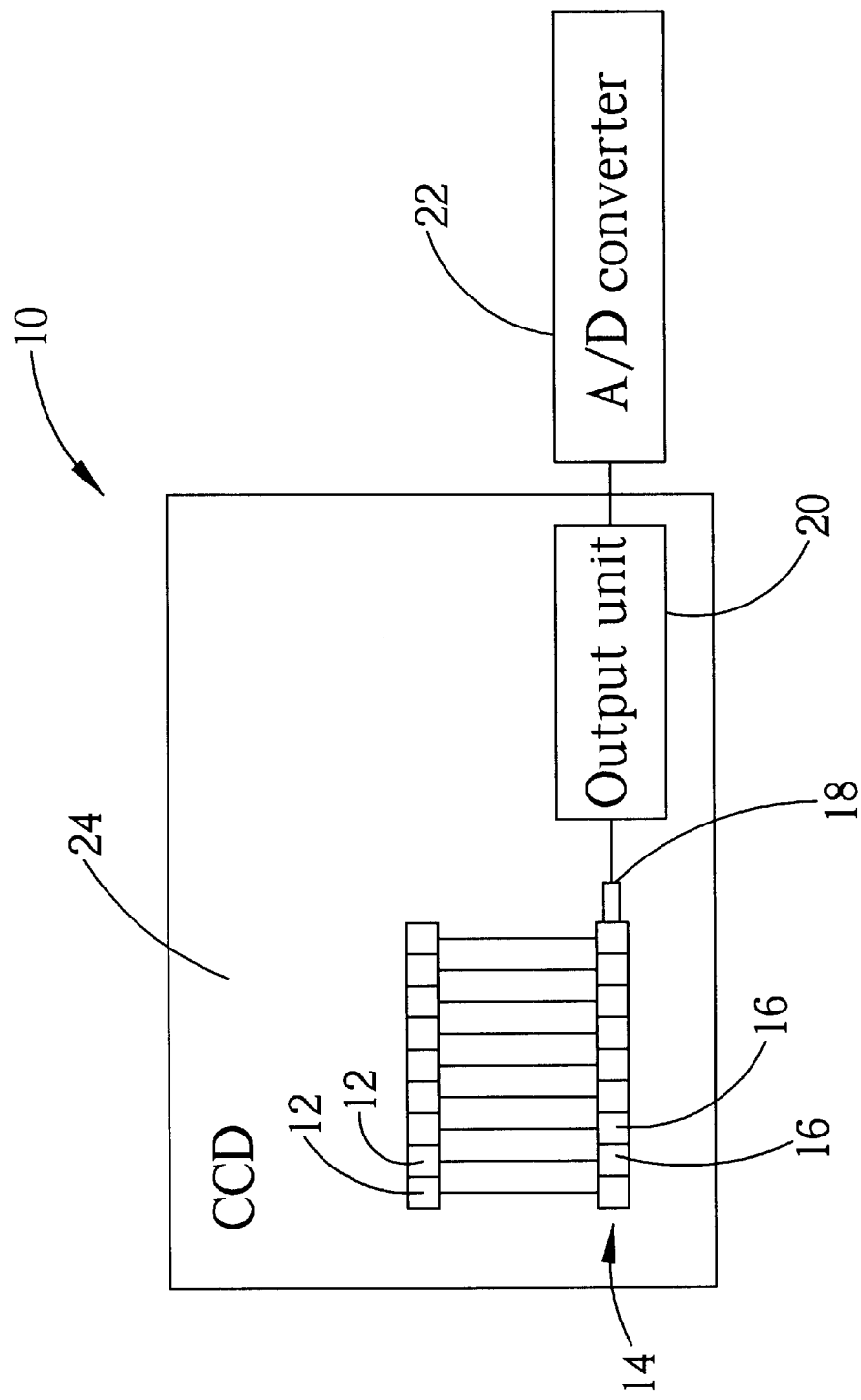
FIG. 3 is a schematic diagram of a high resolution scanning module according to the present invention.

Please refer to FIG. 3. FIG. 3 is a schematic diagram of a high resolution scanning module 10 which is used in the present invention scanning method for performing a low resolution scan. The scanning module 10 comprises a plurality of linearly arranged photo sensors 12, a shift register 14 comprising a plurality of serially connected storage units 16 and an output port 18, an output unit 20 electrically connected to the output port of the shift register 14, and an A/D converter 22 electrically connected to the output unit 20. The photo sensors 12 of the scanning module 10, the shift register 14, and the output unit 20 are installed in a charge coupled device 24. In the shift register 14, the number of the storage units 16 is equal to the number of the photo sensors 12 and each of the storage units 16 is electrically connected with one correspondent photo sensor 12. Each photo sensor 12 senses a document and generates the correspondent induced charges, and each storage unit 16 stores the induced charges generated by the connected photo sensor 12. The induced charges stored in the storage units 16 are able to serially migrate toward the output port 18 where they are sequentially output. The output unit 20 receives the induced charges output from the output port 18 and generates a correspondent induced voltage. The A/D converter 22 converts the induced voltage outputted from the output unit 20 into a digital image signal.

When using the high resolution scanning module 10 to perform the present invention low resolution scanning method, for example performing a scan at ½ of the highest resolution, the scanning method comprises the following steps:

Step 1: activating the photo sensors 12 to sense the light transmitted from the document for ½ of the predetermined time period to generate correspondent induced charges;

Step 2: transmitting the induced charges from the photo sensors 12 into corresponding storage units 16;

Step 3: shifting the induced charges stored in the storage units 16 into the output unit 20 in sequence;

Step 4: outputting the induced voltage of the output unit 20 after induced charges of two of the storage units 16 are accumulated in the output unit 20, and resetting the output unit 20 to continue receiving the induced charges from the output port 18, and using the A/D converter 22 to convert the induced voltage outputted from the output unit 20 into a digital image signal;

Step 5: repeating the previous step until all the induced charges in the storage units 16 are outputted.

The difference between the present invention scanning method for performing a low resolution scan by using a high resolution scanning module and the prior art method is that in step 1 the required exposure time is just ½ of the original amount of time required. Also, in step 4, the output unit 20 is reset each time the induced charges of two storage units are accumulated in the output unit 20. When the induced charges of the first storage unit 16 accumulate in the output unit 20, the output unit 20 is not yet reset, only after the induced charges of the second storage unit 16 accumulate in the output unit 20 does the output unit become reset, that is, every time the induced voltage output by the output unit 20 is equal to the quantity of the induced charges of two storage units 16.

Figure 4:
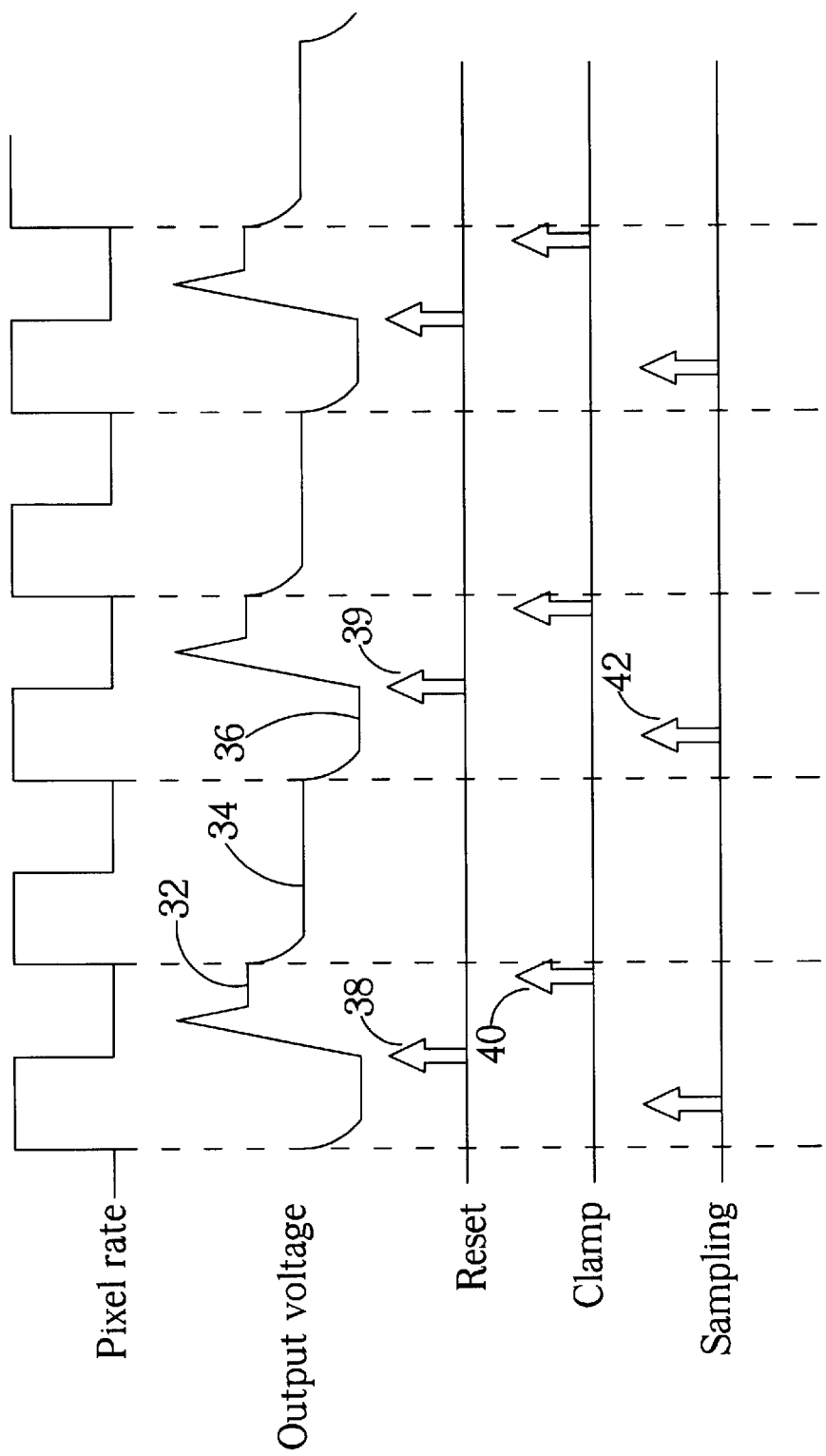
FIG. 4 is a schematic diagram of the signal control of performing a low resolution scan by using a high resolution scanning module shown in FIG. 3.

Please refer to FIG. 4. FIG. 4 is a schematic diagram of the signal control of performing a low resolution scan by using a high resolution scanning module shown in FIG. 3. The first row denotes the pixel rate for migrating the induced charges from the output port 18 of the shifting register 14 one by one, the second row denotes the change of the induced voltage output by the output unit 20, the arrow 38 in the third row denotes the time point for resetting the output unit 20, the arrows 40, 42 in the fourth and fifth rows denote the time for detecting the voltage. After resetting the output unit 20 (the arrow 38), the voltage of the output unit 20 will rise steeply to a peak value and then drop slightly to a base voltage 32. During this time and at this voltage level, the output unit 20 does not receive induced charges from the storage units 16. At the time indicated by arrow 40, the output unit 20 detects this base voltage 32. After the output unit 20 is reset, the output unit 20 receives the induced charges of the first storage unit 16 and the voltage lowers to a first voltage 34. Then, the output unit 20 receives the induced charges of the second storage unit 16 and the voltage lowers to a lower second voltage 36. At this time (indicated by the arrow 42) the second voltage 36 is detected as the sampling voltage. The difference between the sampling voltage and the base voltage possesses the necessary image data and the induced voltage output by the output unit 20 corresponds to the induced charges in two storage units 16. The output unit 20 is then reset (the arrow 39) to continue receiving induced charges.

In the above embodiment a low resolution scan is performed at ½ of the highest resolution, however, a low resolution scan can also be performed at 1/nl of the highest resolution of the highest resolution, nl being any positive integer. For example when performing a low resolution scan at $½^n$ of the highest resolution, n being an integer greater than zero. The only difference is that in step 4 after the induced charges in $2^n$ of storage units 16 are accumulated in the output unit 20 and the accumulated charges support a large enough voltage, the output unit 20 is reset to continue to receive induced charges.

Figure 5:
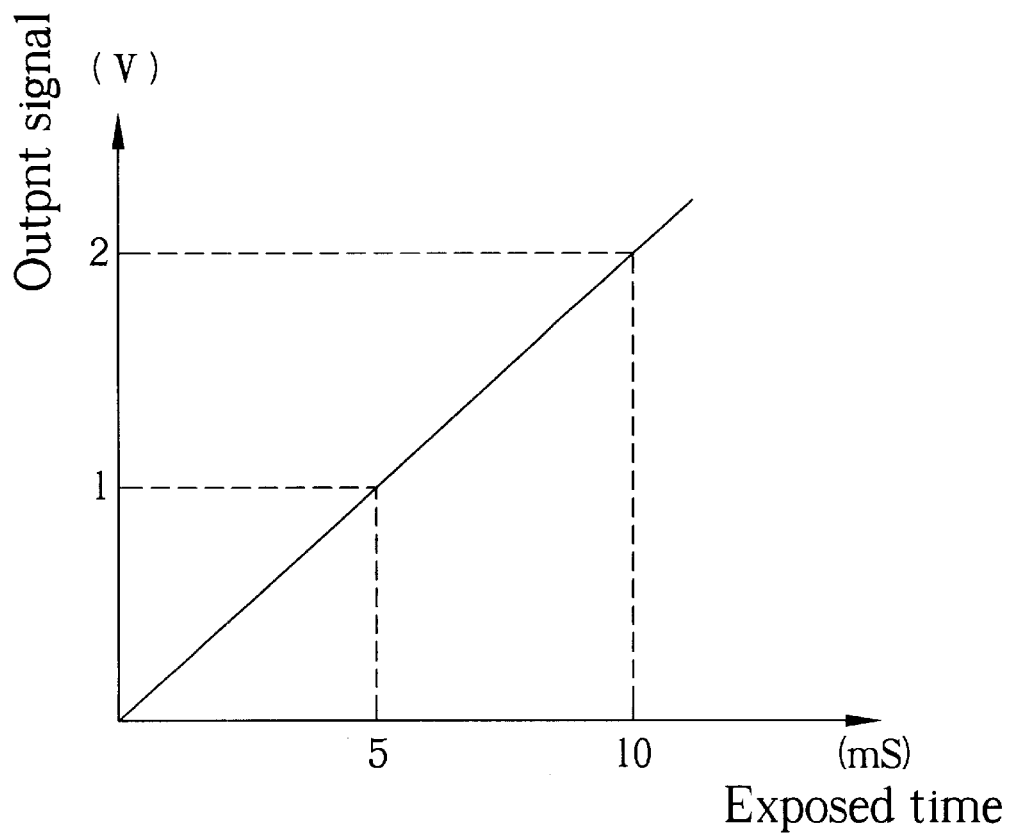
FIG. 5 is a schematic diagram of the relation between the intensity of the image signal and the exposed time.

Please refer to FIG. 5. FIG. 5 is a schematic diagram of the relation between the outputted voltage of the CCD and the exposure time. The longer the exposure time, the stronger the output voltage of the CCD, and assuming the relation is linear, when the resolution of the scanning device is 1200 dpi, the required exposure time is 10 mS (milli-seconds) correspondent to the output voltage 2V. No matter what resolution is used in scanning in the prior art method, it is necessary to expose the CCD for a sufficient amount of time so that the image signal can be maintained at 2V, that is 10 ms of exposure time. However, in the present invention method, if, for example a scan is performed at 600 dpi from the highest resolution of 1200 dpi, charge is output once only after the induced charges are accumulated twice. Therefore, if the required output voltage is 2V, then each time the voltage required is just 1V and the required CCD exposure time is just 5 mS. Similarly, it only takes 2.5 mS of exposed time at 300 dpi.

If the exposure time of the photo sensors during low resolution scanning is taken as the first predetermined time period and the minimum exposure time of the photo sensors scanning at the highest resolution is taken as the second predetermined time period, then when performing a low resolution scan by the present invention method at $\frac{1}{2^n}$ of the highest resolution, as long as the first predetermined time period is approximately equal to the second predetermined time period divided by $2^n$, the total induced charges generated by $2^n$ of the photo sensors 12 is approximately equal to the induced charges generated by one of the photo sensors 12 after exposure for the second predetermined time period. So when using the present invention method to perform the low resolution scan, because the exposure time of the photo sensors is shortened, the low resolution scan can be performed rapidly.

Compared to the prior art method, when performing a low resolution scan using a high resolution scanning module according to the present invention, the scanning method is to shorten the exposure time of the photo sensors 12 in the CCD 24 while maintaining the strength of the image signal, and to covert the induced voltage output by the output unit 20 into a digital image signal after the induced charges in a predetermined number of the storage units 16 are accumulated in the output unit 20. Because the exposure time of the photo sensors 12 is shortened when performing a low resolution scan, the low resolution scan can be performed rapidly.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A scanning method for performing a low resolution scan by using a high resolution scanning module, the scanning module comprising:
   a plurality of linearly arranged photo sensors, each of the photo sensors being capable of sensing light transmitted from a document to generate correspondent induced charges;
   a shift register comprising a plurality of serially connected storage units and an output port, the number of the storage units being equal to the number of the photo sensors, each of the photo sensors being electrically connected with only one correspondent storage unit, the storage units for storing the induced charges generated by the connected photo sensor, the induced charges stored in the storage units being able to serially migrate toward the output port and sequentially output from the output port; and
   an output unit electrically connected to the output port of the shift register for receiving the induced charges output from the output port and generating a correspondent induced voltage;
   the low resolution scanning method comprising:
      activating the photo sensors to sense the light transmitted from the document for a first predetermined time period to generate correspondent induced charges;
      transmitting the induced charges from the photo sensors into corresponding storage units;
      shifting the induced charges stored in the storage units into the output unit in sequence;
      outputting the induced voltage of the output unit after induced charges of a plurality of the storage units are accumulated in the output unit, and resetting the output unit to continue receiving the induced charges from the output port the plurality of storage units being approximately equal to the high resolution divided by the low resolution; and,
      repeating the previous step until all the induced charges in the storage units are output.

2. The scanning method of claim 1 wherein the scanning module further comprises an A/D converter electrically connected to the output unit for converting the induced voltage output from the output unit into a digital image signal.

3. The scanning method of claim 1 wherein when the scanning module scans the document at the highest resolution, the photo sensors need to be exposed to the light transmitted from the document for at least a second predetermined time period so as to generate correspondent induced charges, and the second predetermined time period is longer than the first predetermined time period.

4. The scanning method of claim 3 wherein the first predetermined time period is greater than or equal to the second predetermined time period divided by the first predetermined number.

5. The scanning method of claim 3 wherein the first predetermined time period is approximately equal to the second predetermined time period divided by the first predetermined number so that the accumulated induced charges from the first predetermined number of the storage units is approximately equal to the accumulated induced charges generated by each of the photo sensors after exposing to the light transmitted from the document for the second predetermined time period.

6. The scanning method of claim 1 wherein the photo sensors of the scanning module, the shift register, and the output unit are installed in a charge coupled device.

7. The scanning method of claim 1 wherein the number of the plurality of the storage units equals $2^n$, n being an integer greater than zero.

8. A high resolution scanning module capable of performing a low resolution scan, the scanning module comprising:
   a plurality of linearly arranged photo sensors, each of the photo sensors being capable of sensing light transmitted from a document to generate correspondent induced charges;
   a shift register comprising a plurality of serially connected storage units and an output port, the number of the storage units being equal to the number of the photo sensors, each of the storage units being electrically connected with a correspondent photo sensor for storing the induced charges generated by the connected photo sensor, the induced charges stored in the storage units being able to serially migrate toward the output port and sequentially output from the output port; and,
   an output unit electrically connected to the output port of the shift register for receiving the induced charges output from the output port and generating a correspondent induced voltage, the output unit for outputting the induced voltage of the output unit after induced charges of a first predetermined number of the storage units are accumulated in the output unit, the first predetermined number being approximately equal to the high resolution divided by the low resolution the output unit then resetting to continue receiving the induced charge from the output port;
   wherein the accumulated induced charges from the first predetermined number of the storage units is approximately equal to the accumulated induced charges generated by each of the photo sensors after exposure to the light transmitted from the document when scanning the document in high resolution.

9. The scanning module of claim 7 wherein the photo sensors are exposed to the light transmitted from the document for a first predetermined time period when scanning the document in low resolution and the photo sensors are exposed to the light transmitted from the document for a second predetermined time period when scanning the document in high resolution, the first predetermined time period being less than the second predetermined time period.

10. A scanning method for performing a low resolution scan using a high resolution scanning module, the scanning module comprising:

a plurality of linearly arranged photo sensors, each of the photo sensors being capable of sensing light transmitted from a document to generate correspondent induced charges;

a shift register comprising a plurality of serially connected storage units and an output port, the number of the storage units being equal to the number of the photo sensors, each of the storage units being electrically connected with a correspondent photo sensor for storing the induced charges generated by the connected photo sensor, the induced charges stored in the storage units being able to serially migrate toward the output port and sequentially output from the output port; and an output unit electrically connected to the output port of the shift register for receiving the induced charges output from the output port and generating a correspondent induced voltage;

the low resolution scanning method comprising:

activating the photo sensors to sense the light transmitted from the document for a first predetermined time period to generate correspondent induced charges;

transmitting the induced charges from the photo sensors into corresponding storage units;

shifting the induced charges stored in the storage units into the output unit in sequence;

outputting the induced voltage of the output unit after induced charges of a first predetermined number of the storage units are accumulated in the output unit, and resetting the output unit to continue receiving the induced charges from the output port, the first predetermined number being approximately equal to the high resolution divided by the low resolution; and repeating the previous step until all the induced charges in the storage units are output.

11. The scanning method of claim 10 wherein the scanning module further comprises an A/D converter electrically connected to the output unit for converting the induced voltage output from the output unit into a digital image signal.

12. The scanning method of claim 10 wherein when the scanning module scans the document at the highest resolution, the photo sensors need to be exposed to the light transmitted from the document for at least a second predetermined time period so as to generate correspondent induced charges, the second predetermined time period being longer than the first predetermined time period.

13. The scanning method of claim 12 wherein the first predetermined time period is approximately equal to the second predetermined time period divided by the first predetermined number so that the accumulated induced charges from the first predetermined number of the storage units is approximately equal to the accumulated induced charges generated by each of the photo sensors after exposing to the light transmitted from the document for the second predetermined time period.

14. The scanning method of claim 10 wherein the photo sensors of the scanning module, the shift register, and the output unit are installed in a charge coupled device.

15. The scanning method of claim 10 wherein the first predetermined number equals nl, nl being any positive integer.

16. The scanning method of claim 10 wherein the first predetermined number equals $2^n$, n being an integer greater than zero.

* * * * *